(12) United States Patent
Stewart

(10) Patent No.: US 6,504,706 B2
(45) Date of Patent: Jan. 7, 2003

(54) PRESENTATION DEVICE

(75) Inventor: Steven John Stewart, West Yorkshire (GB)

(73) Assignee: ICE 21 Limited, Bradford (GB)

( * ) Notice: Subject to any disclaimer, the term of this patent is extended or adjusted under 35 U.S.C. 154(b) by 0 days.

(21) Appl. No.: 09/423,608

(22) PCT Filed: May 12, 1998

(86) PCT No.: PCT/GB98/01257

§ 371 (c)(1),
(2), (4) Date: Nov. 15, 1999

(87) PCT Pub. No.: WO98/52116

PCT Pub. Date: Nov. 19, 1998

(65) Prior Publication Data

US 2002/0071246 A1 Jun. 13, 2002

(30) Foreign Application Priority Data

May 14, 1997 (GB) ................................. 9709737

(51) Int. Cl.[7] ............................................. G06F 1/16
(52) U.S. Cl. ................. 361/681; 361/683; 361/729; 400/83; 312/223.2; 348/913; 345/169
(58) Field of Search .................. 361/679–686, 361/729, 380, 390–395, 399; 400/83, 88, 680–682, 685; 312/223.2; 248/913, 455; 40/152.1, 493; 439/31, 12; 345/169

(56) References Cited

U.S. PATENT DOCUMENTS

| 4,571,456 A | * | 2/1986 | Poulsen et al. ............. 179/2 C |
| 4,931,950 A | | 6/1990 | Isle et al. |
| 5,105,338 A | | 4/1992 | Held .......................... 361/391 |
| 5,131,512 A | * | 7/1992 | Steinhilber et al. .... 188/322.19 |
| 5,260,884 A | * | 11/1993 | Stern ........................ 364/708.1 |
| 5,268,817 A | * | 12/1993 | Miyagawa et al. ......... 361/729 |
| 5,305,183 A | | 4/1994 | Teynor ....................... 361/686 |
| 5,379,893 A | | 1/1995 | Ruiz ........................... 206/320 |
| 5,485,922 A | | 1/1996 | Butcher ...................... 206/576 |
| 5,494,447 A | * | 2/1996 | Zaidan ......................... 439/31 |
| 5,534,891 A | * | 7/1996 | Takano ....................... 345/169 |
| 5,586,002 A | | 12/1996 | Notarianni .................. 361/681 |
| 5,682,993 A | | 11/1997 | Song ........................... 260/320 |
| 5,796,575 A | | 8/1998 | Podwalny et al. .......... 361/681 |
| 5,839,553 A | | 11/1998 | Dorsam ...................... 190/109 |

FOREIGN PATENT DOCUMENTS

| DE | 196 37 854 | 3/1997 |
| FR | 2664138 | 1/1992 |

OTHER PUBLICATIONS

Patent Abstracts of Japan, vol. 017, No. 363, Jul. 8, 1993 & JP 05 053991 A.
Derwent, 92–09844.
Derwent, 97–194097.

* cited by examiner

Primary Examiner—Darren Schuberg
Assistant Examiner—Yean-Hsi Chang
(74) Attorney, Agent, or Firm—Arent Fox Kintner Plotkin & Kahn, PLLC

(57) ABSTRACT

The invention relates to a portable presentation device (1) comprising a container having a lid (3) and a base (4), a first display device (7) and a controller (10) for driving the first display device (7). The portable presentation device is in the form of a briefcase, with the first display device (7) built into the lid (3) of the briefcase. With the lid (3) opened so that the first display device (7) is perpendicular to the base, presentations may be conveniently given to a small group of viewers with the first display device (7) being manipulable by means of the controller (10). The controller (10) may also have its own display (11) so that the operator may easily view and control the presentation himself.

44 Claims, 10 Drawing Sheets

PRESENTATION DEVICE

This invention relates to a portable device for enabling presentations etc. to be given to a small group of people.

When giving a talk it is often desirable to be able to supplement the talk by the visual presentation of related information, for example, diagrams, graphs, video or summaries of the most relevant points.

If one wishes to give a talk to a small audience it is usual to use an overhead projector to present this related information. However, if the speaker has to travel to give the talk (for example, a salesman visiting a client) the speaker will find it very inconvenient to have to bring a separate projector with associated screens and cables to the venue.

In order to overcome this problem portable computers are occasionally used as presentation devices when giving talks. However, portable computers only possess limited viewing angles and often have small screens making it impractical for more than two or three people to view the presentation simultaneously. Also the speaker and audience must sit side by side so reducing the eye contact and interaction between them.

The present invention provides a presentation device comprising:
  a container having a lid and a base;
  a first display device; and
  means for driving the first display device.

Preferably, said first display device is provided built-in to the lid of the container and arranged, in use, to face away from an interior region of the container so as to be viewable from the exterior.

Preferably, the first display device is arranged to be viewable when the container is in an open configuration. Preferably, the first display device is arranged for optimum viewing when the container is in the open configuration with the first display device oriented toward a viewer or toward the centre of a group of viewers.

In preferred embodiments, the first display device is built-in to an outer face of the lid. The presentation device may include a removable cover for covering the first display device when not in use.

The cover may be fastened to the container by a zip. In one alternative, the cover may be fastened to the container by press studs or cup fasteners.

The cover is preferably not removable when the container is in a closed configuration. Preferably, the cover is lockable in position by means of an actuator positioned inside the container. The cover is preferably releasably associated with the lid by latching means manipulable from inside the container.

In preferred embodiments of the invention, the first display device is built-in to an interior face of the lid in such a manner that in a closed configuration the first display device faces the interior of the device and is thus protected from external tampering whereas in an open configuration the presentation device is reconfigurable such that, in use, the first display device is arranged to face away from an interior region of the container.

The presentation device may be reconfigurable such that, in use, in the open configuration the lid of the device is arranged to be substantially at right angles to the base.

The presentation device may be reconfigurable by means of a lid pivoting mechanism having, on opposing side faces of the base, left and right side mechanisms comprising a pivot post associated with a link member, a first end of the respective link member being adapted to co-operate with the pivot post and being rotatable about the pivot post and a second end of the respective link member being arranged to co-operate in a slidable manner with respect to the corresponding left or right lid side face to allow the lid of the device to slide with respect to the base and to be rotatable so as to allow the interior face of the lid to be moved into a configuration in which it faces away from the base.

The second ends of the link members may interact with a track formed on the corresponding lid side face to allow said sliding and rotating motion. The track may comprise a slot formed in the corresponding lid side face and track following means formed on the second end of the link member. The track may comprise an at least partially shrouded slot and the track following means may comprise an enlarged head formed on the second end of the link member and arranged to fit within said slot.

Alternatively, the presentation device may be reconfigurable by means of providing left and right base post members positioned on opposing base sides, left and right lid post members positioned on opposing lid sides and left and right elongated link members linking the left post members to each other and the right post members to each other.

Preferably, the elongated link members each define an elongate slot which encloses an outer periphery of the posts which they link, said slot being sufficiently long to allow the lid to be moved away from a position in which it overlies the base in the closed position, in which closed position the interior of the lid faces towards the interior of the base, and moved to an open position in which the lid interior and the base interior face in substantially opposite directions. In the open position, the first display device may be maintained in a viewing position by an end face of the base leaning against, and supporting, an end face of the lid.

The container may comprise a piece of luggage, preferably a brief or attache case.

The piece of luggage may comprise any portable container with a lock or catch for maintaining the container in the closed position. The piece of luggage may also include a handle. The piece of luggage may be of sufficient dimensions to receive ancillary equipment such as disk drives etc. The piece of luggage may include means for retaining papers etc. Preferably, the interior of the container has the appearance of the interior of a standard briefcase including compartments for storing documents needed in the presentation etc.

Said means for driving said first display device may comprise a controller and a connector for connecting the first display device to the controller.

The connector can include components to modify the signal passing through it to or from the controller.

Said controller may comprise a micro-computer, for instance, a palm-top or a lap-top computer. Preferably, the container base is configured to removably receive the controller. Alternatively, the means for driving the first display device may comprise a built-in controller.

The presentation device of the invention has the advantage that it is a self contained unit which can be easily transported to a meeting or lecture. All of the fragile components are protected by the container.

The presentation device of the invention also has the advantage that it can be quickly and easily adjusted from a closed storage configuration to an open presentation configuration.

The presentation device of the invention also has the advantage that, when in use, the audience can observe the first display device whilst the speaker can face the audience and simultaneously control the first display device using the controller.

Preferably, the controller includes a second display device which may be viewed by an operator whilst the first display device can be viewed by the audience. The controller may comprise a keyboard, a touch sensitive screen on the second display device, mouse or other pointing device for directing operations of the controller. The controller may also comprise a data storage device such as a CD Rom Drive or disc drive.

The first display device may include a touch sensitive screen.

The controller may comprise a processor and a memory.

The presentation device may be operable without an external power supply or may receive power directly from the controller.

Generally, the lid and the base of the presentation device are connected by a hinge.

The body and lid of the presentation device may be disengageable so that the lid can be located remotely from the body.

The presentation device can include a means for supplying power to at least a portion of the presentation device.

The power supply might include for example a battery or a transformer for converting mains voltage to a voltage suitable for use by the presentation device, or both. The power supply components can be built into the container.

Preferably, the presentation device comprises a second display device located within the container. The second display device can display information relating to the first display device. The second display device may be an integral part of the controller.

The presentation device may include at least one interconnector by which one or more peripheral devices can be connected to the controller. The connector for connecting the first display device to the controller may be an integral portion of the interconnector.

These peripheral devices may include power supply components, a personal computer, a data storage device, a printer, a camera, audio system, picture encoding or decoding circuitry, a microphone or other peripheral.

Any of the above devices may be built into the presentation device. That is to say that they are attached to the presentation device in such a way that they are not suitable for removal by a user of the presentation device.

Any of the above devices may be provided in or attached to the presentation device in such a way that they can be removed and replaced by different devices.

The presentation device may include circuitry for enabling the presentation device to be controlled remotely.

The presentation device can include an external connector, said external connector being for connecting external peripherals to the presentation device. The external connector may be a portion of the interconnector. The external connector may be a standard connector such as a PCMCIA type interface, IEEE interface or RS232 interface.

The first display device may comprise any suitable display, such as one of a liquid crystal display, light emitting polymer, or gas plasma display. The first display device may be monochrome or colour.

The viewable area of the first display device may be less than 1 m$^2$.

Preferably, the viewable area of the first display device is less than 0.25 m$^2$.

More preferably, the area of the first display device is less than 0.2 m$^2$ and greater than 0.015 m$^2$.

The ratio of the external area of the lid and the area of the first display device may be less than 0.95.

Preferably, the ratio of the external area of the lid and the area of the display is less than 0.7 and greater than 0.5.

The presentation device may include at least one leg for stabilising the presentation device when it is in an open configuration. The leg may be hingedly attached to the presentation device. Preferably, the leg is hingedly attached to the lid. Preferably, as the lid is moved from a closed configuration to the open configuration, said leg is automatically extended so as to maintain the lid at an open position approximately perpendicular to the base. Automatic extension of the leg may be achieved by providing an abutment on the base which, as the lid is raised, urges the leg toward a fully open position in which it can support the lid. Spring biasing may be provided such that once the leg has gone beyond a certain position, the biasing means automatically extends the leg to the fully open position.

The leg may be detachable from the presentation device. For example, the leg may extend from the lid of the device when open, or from the face of the base to which the lid is attached, to the surface on which the device is supported.

The device may include an interior support member to maintain the lid in an open position. Said interior support member may comprise a telescopic damper to provide a controlled amount of damping to said lid when closing it. The damper may be a friction damper or could be air or gas filled. The damper is arranged to minimise the chances of the lid accidentally closing and fingers inadvertently being trapped between lid and base.

The device may include means for cooling. Said means for cooling may comprise a fan housed in said lid and having air intakes and outlets arranged such that air may be drawn through the air intakes by the fan, across electronic components of the device, and out of the air outlets.

For a better understanding of the invention, and to show how embodiments of the same may be carried into effect, reference will now be made, by way of example, to the accompanying diagrammatic drawings, in which.

Figure 1:
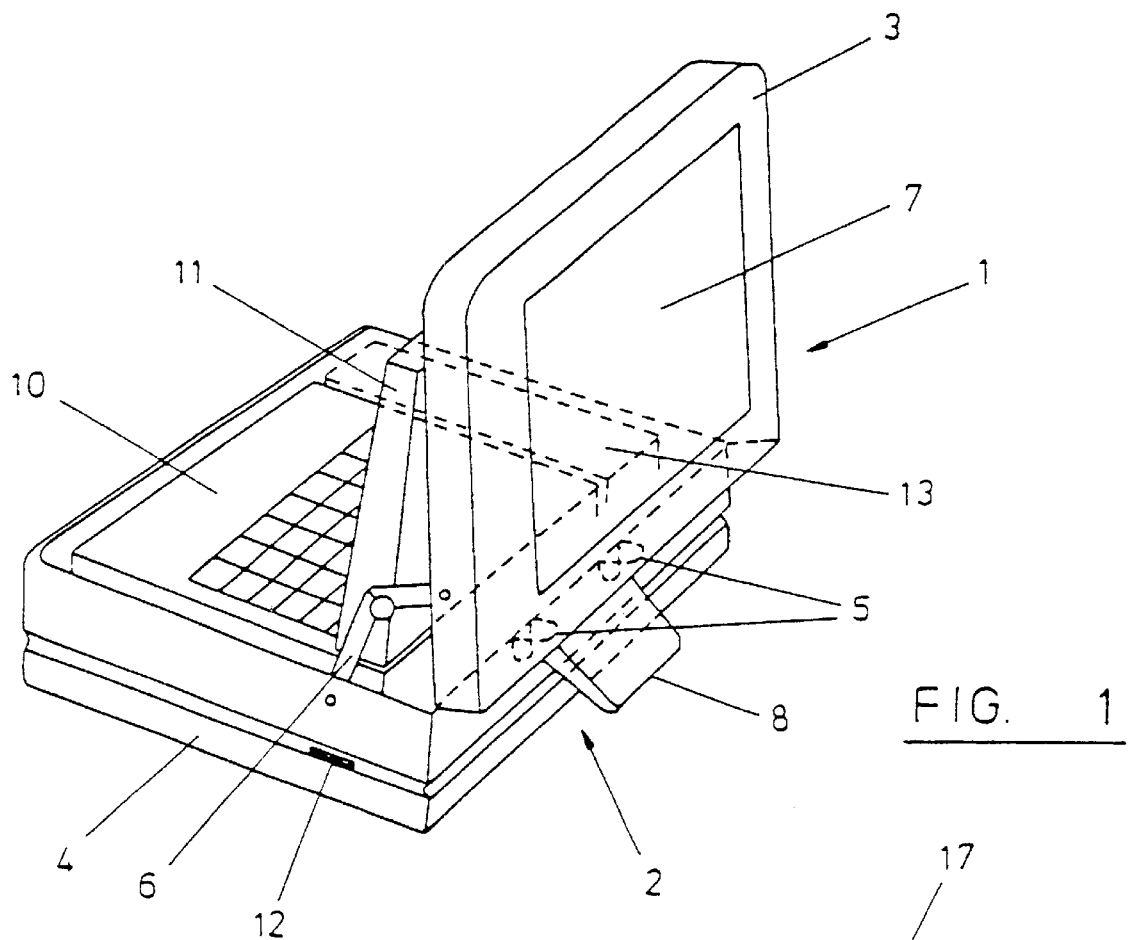
FIG. 1 is a perspective view of a first embodiment of the presentation device with the container in the open configuration.

Referring to the drawings, the presentation device 1 shown in FIG. 1 comprises a container 2 having a lid 3 and base 4. The container 2 is a briefcase. The lid 3 and base 4 are connected by a hinge 5 (shown dotted) enabling the lid 3 to be rotated with respect to base 4 between open and closed positions. Supports 6 connected between the lid 3 and base 4 are for maintaining the lid 3 in the open position. Other support methods may be used.

A portion of the lid 3 of the container comprises a first display device in the form of an electronic display 7. The electronic display 7 may be a liquid crystal display or any other suitable display. The electronic display 7 is fixed within the container lid 3 internally and is viewed from the exterior.

A leg 8 is hingedly attached to the base 4 preventing the presentation device 1 from overbalancing if the electronic device 10 is removed. Preferably, the leg 8 is arranged to deploy automatically upon opening the lid 3.

Figure 2:
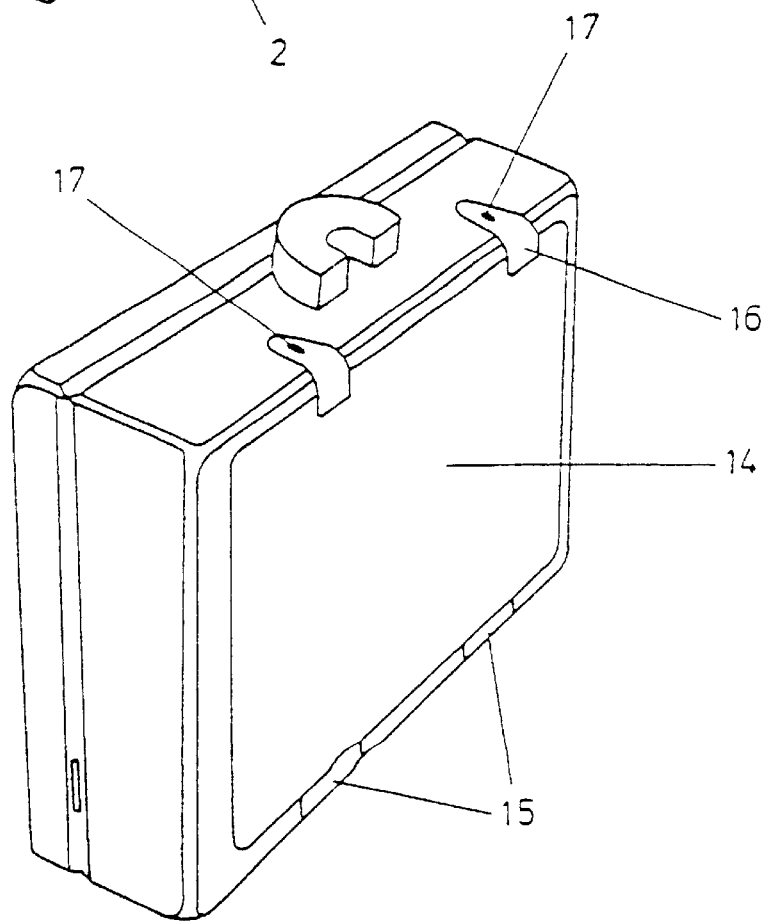
FIG. 2 is a perspective view of the presentation device of FIG. 1 in the closed configuration with a cover covering the display.
Figure 3:
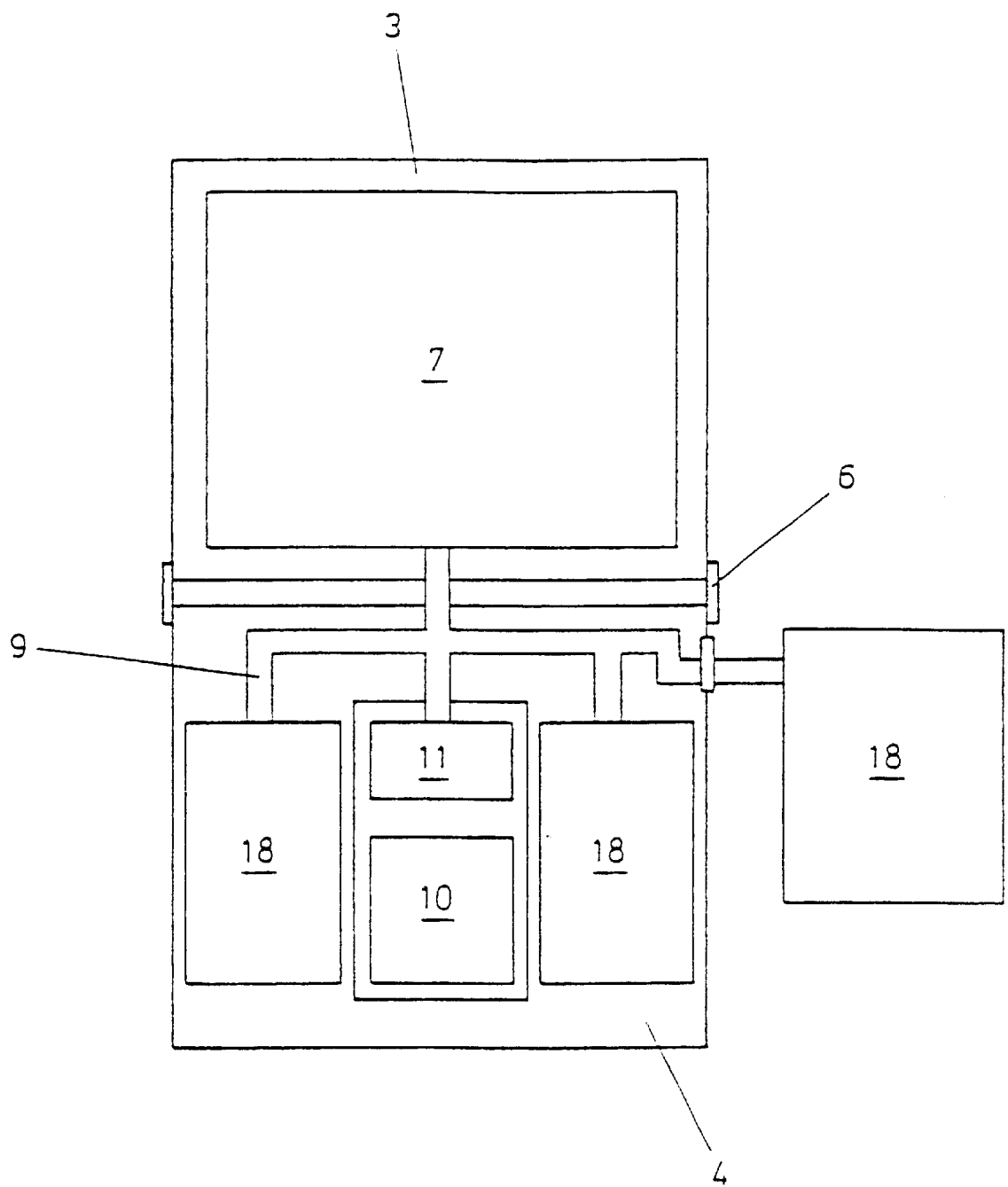
FIG. 3 is a schematic view of the presentation device with added peripherals.

Located within the base 4 is an interconnector 9 (not shown in FIGS. 1 or 2—shown schematically in FIG. 3). One portion of the interconnector 9 is connected to the electronic display 7. A further port of the interconnector is connected to an electronic device 10. The electronic device 10 is a portable computer having a second display device in the form of electronic display 11. The portable computer can be disconnected from the interconnector 9 and removed from the presentation device 1. The personal computer could be replaced by a different electronic device 10 for creating images to be displayed on the external display 7.

An external port 12 of the interconnector 9 extends through the external wall of the container 2. Such an external port 12 may be utilised for connection to additional peripherals (not shown). The external connector 12 is a PCMCIA type interface. The interconnector 9 has additional connection ports for connection to additional peripherals located within the base 4. Located within the base 4 and attached to the interconnector 9 is an independent power supply 13 (shown dotted). The independent power supply 13 can be disconnected from the interconnector 9 and replaced by a transformer for transforming mains power to the correct voltage to power the external display 7. Additionally, the transformer can be connected to a further port of the interconnector 9 and can simultaneously recharge the independent power supply and power the external display 7.

Shown in FIG. 2 is the presentation device 1 in the closed position. A cover 14 covers the electronic display 7 protecting it from damage during transport. The cover 14 is held in place by fastenings 15 and 16. The fastenings 15 and 16 are connected to the container 2 by fasteners 17. In order to remove the cover 14, the fastenings are disengaged from the container 2. The cover 14 may then be disengaged and removed.

In order to use the presentation device 1 of the invention the container 2 is arranged in its open position with the base supported by a table or other horizontal flat surface. The container 2 is unlocked and the lid rotated about the fastenings 15 until it is perpendicular to the surface. Peripherals are then attached to the interconnector 9 in the required configuration. Once the interconnector 9 has been connected to a power source (either the independent power source 13 or a transformer which is in turn connected to the mains) the presentation device 1 is activated.

Once activated the electronic device 10 creates an image to be displayed on the electronic display 7. This image is sent to the interconnector 9. On receipt of the image the electronic display 7 displays the image to the audience. A second copy of the image may be displayed on the second electronic display 11.

By touching the second electronic display 11 or other input device of the electronic device 10 the user may change the image displayed on both displays 7, 11. The input device may also include a mouse.

The interconnector 9 may transmit peripheral control signals from the electronic device 10 to the peripherals or vice-versa. The electronic device 10 may then synchronise the action of peripherals, (for example, a sound generator) with the presentation of the display 7.

FIG. 3 shows a schematic view of the presentation device 1. Attached to the interconnector 9 of the presentation device 1 are a number of peripherals 18. These peripherals 18 can be removed and replaced with further peripherals 18. They can also be interchanged.

The attachable peripherals include any type of mass storage media such as CD ROM, DVD, CDR, CDRW or Magnetic Media. Any one of a range of printers or plotters for providing a hard copy output, a camera, an audio system providing sound to presentation, picture encoding or decoding circuitry for TV/RF, digital, satellite or any other video input signals, microphones and circuitry for speech recording or recognition, further electronic displays, or circuitry for enabling the display device to be remote controlled via wire or wireless connection.

In an alternative embodiment the presentation device may be provided with a dedicated built-in controller. Such a controller is relatively inexpensive to manufacture because it does not have to be able to operate independently of the presentation device. It can use the same power supply as the display 7. Such a controller may comprise a processor, a memory and a keyboard arranged in a casing which is in turn interengaged with an inner wall of the presentation device. The device may also be provided with, for instance, a built-in CD player so as to be able to reproduce pre-recorded presentations, in which case the controller may, in its simplest form, simply respond to basic functions such as on, off, play, pause, stop etc.

The electronic device is designed to take up a minimum amount of space within the case enabling the presentation device to also be used as a conventional briefcase.

Referring now to FIGS. 4 to 9, a second embodiment of the present invention will now be described in detail. Where features in the second embodiment are equivalent to features in the first embodiment, like reference numerals will be used.

Figure 4:
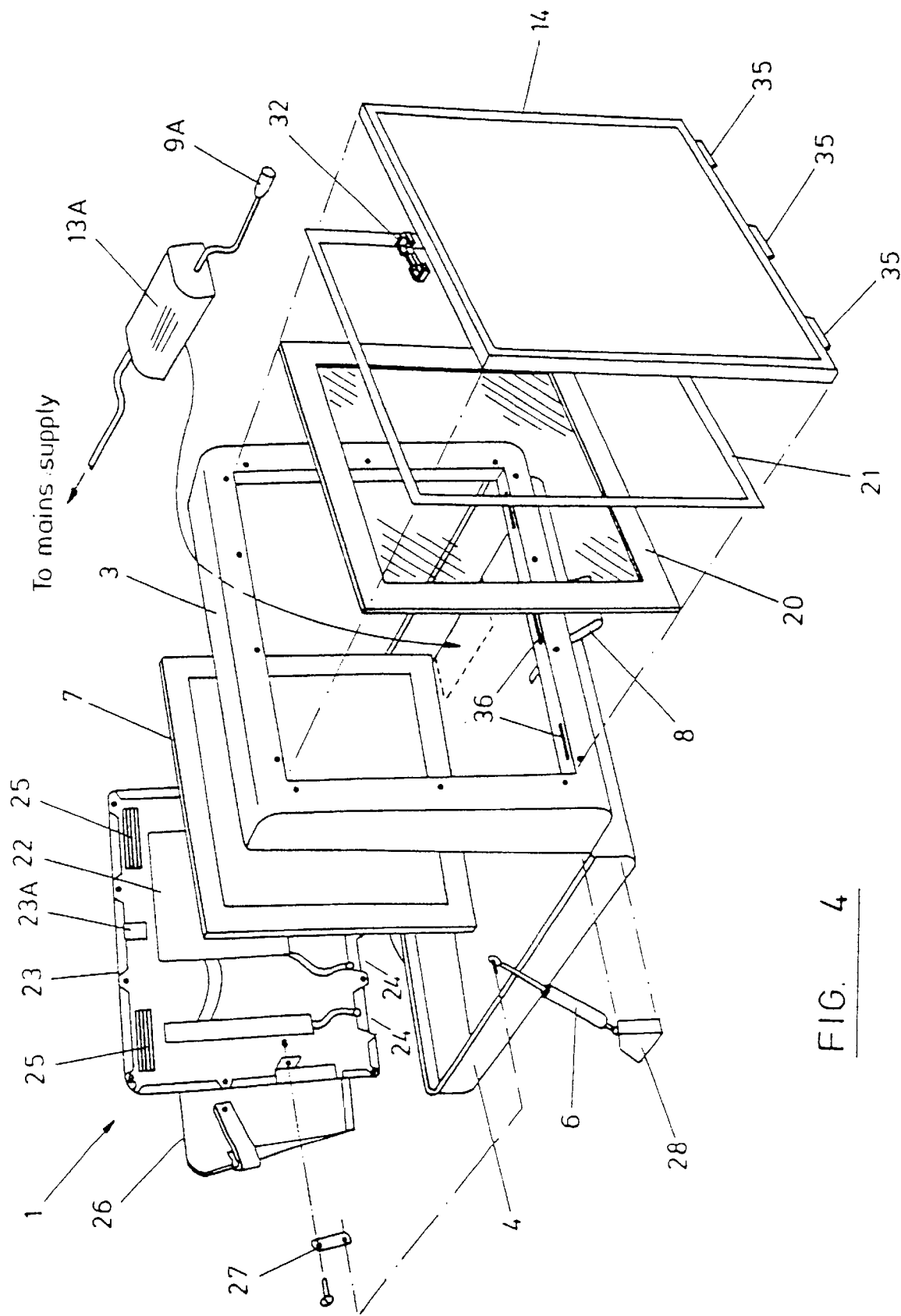
FIG. 4 is an exploded view of a second embodiment of said device.
Figure 5:
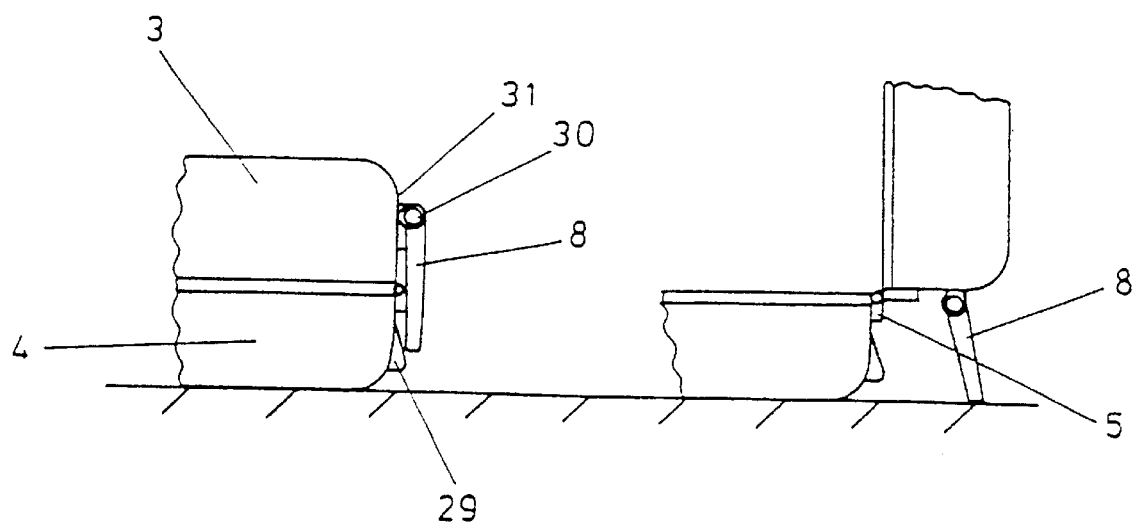
FIG. 5 shows detail of a leg for maintaining the device in a stable configuration when opened.
Figure 6:
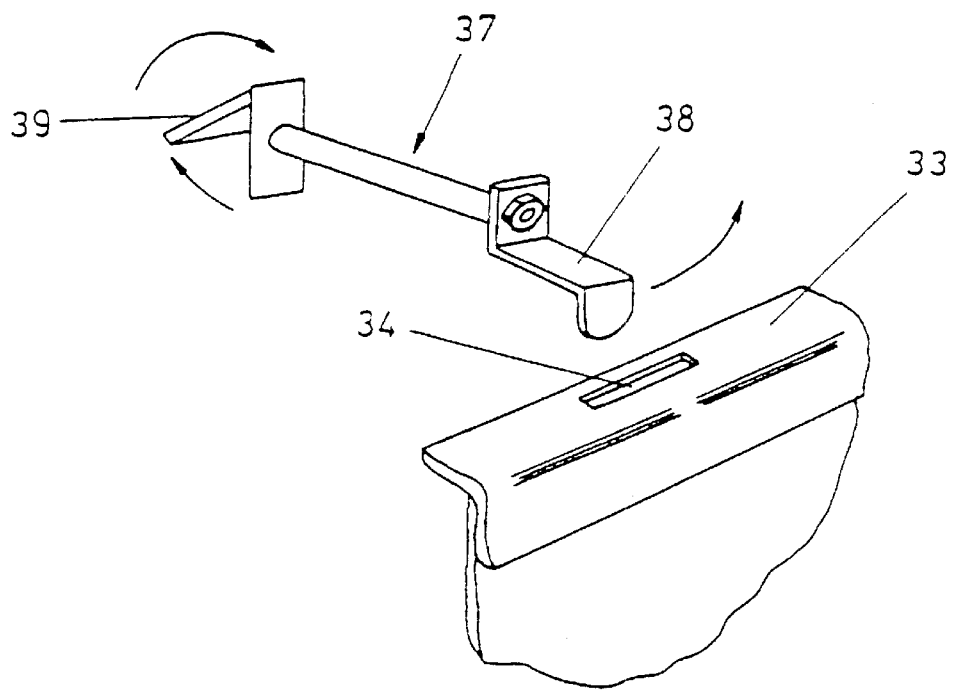
FIG. 6 shows detail of a remote latching mechanism for maintaining a cover in place over said display.

Referring initially to FIGS. 4 to 6, there is shown a presentation device 1 in the form of a briefcase having a lid 3 and a base 4. The lid 3, in similar fashion to that of the first embodiment houses the first display device 7 which is coverable by means of removable cover 14. Additionally, the lid 3 houses an acrylic filter 20 and an outer bezel 21 which are permanently mounted to the lid 3 and positioned between the removable cover 14 and display 7. The lid 3 also features, mounted in an inner part of the brief case, a number of electronic assemblies 22 which are mounted on the rear surface of an inner trim panel 23. Such electronic assemblies may include componentry related to the first display device to interface it with a controller and peripherals for instance, as well as, for instance, a cooling/ventilation system. The inner trim panel 23 is also provided with air inlets 24 and outlets 25 whose function will be discussed later, a document pocket 26 and damper pivot means 27. The damper pivot means 27 forms an upper link to air damper 6, the damper 6 also having a lower link 28 which attaches to the base 4 of the device 1. A transformer 13A is shown as being removably mounted in a portion of the base 4 so as to enable an appropriate voltage to be fed to the electronic assemblies 22 and for driving first display device 7 via connector 9A.

Referring now to FIG. 5, some detail of how a support leg 8 deploys is shown.

To the right hand side of FIG. 5, there is shown the device 1 in an open configuration and, on the left hand side of FIG. 5, there is shown the device in a closed configuration. It can be seen from the closed configuration that the support leg 8 is folded and rests against an abutment 29. As the lid 3 is opened by unlocking it and rotating it by means of hinges 5, it can be seen that during the initial stages of opening the leg 8 which has a top pivot 30 will bear upon abutment 29 which will cause the main extent of the leg 8 to move out of parallel relation with an end wall 31 of the lid 3. The leg 8 is provided with spring biasing means (not shown) such that once the leg 8 has moved out of parallel relation from the end wall 31 beyond a given amount, the leg 8 will spring out so as to adopt the position shown on the right in FIG. 5. In this way, the leg 8 automatically deploys so as to stop the device from toppling over.

Referring now to FIG. 6 in combination with FIG. 4, a means of securing the front cover 14 to the lid 3 will be described. The front cover 14 includes a front cover ejector 32 which is hidden beneath an outer frame 33 of the cover 14 and accessible via a slot 34. The cover 14 also has on a bottom surface thereof, a number of projections 35 which cooperate with slots 36 formed in the lid 3.

A latching assembly 37 comprises a latching member 38 and latch release means 39. The latch release means is, in use, accessible from inside the brief case and operates through a latch release hole 23A, formed in the trim panel 23.

To operate latch assembly 37, the release means 39 is lifted and twisted in the manner shown which causes the latching member 38 to rotate. The latching member 38 extends through slot 34 to cooperate with the front cover ejector 32 and, when the latching member 38 is moved away from the front ejector 32, the ejector works so as to spring the top edge of the cover 14 away from the lid 3. Once the top edge has been released in this way, a user may then simply pull the cover 14 vertically away from the device so as to dislocate projections 35 from their respective slots 36. Replacing of the cover 14 is the opposite of removal. It will be appreciated that the arrangement described is advantageous in that the cover 14 may only be removed once the device 1 has been placed in the open configuration.

Figure 7:
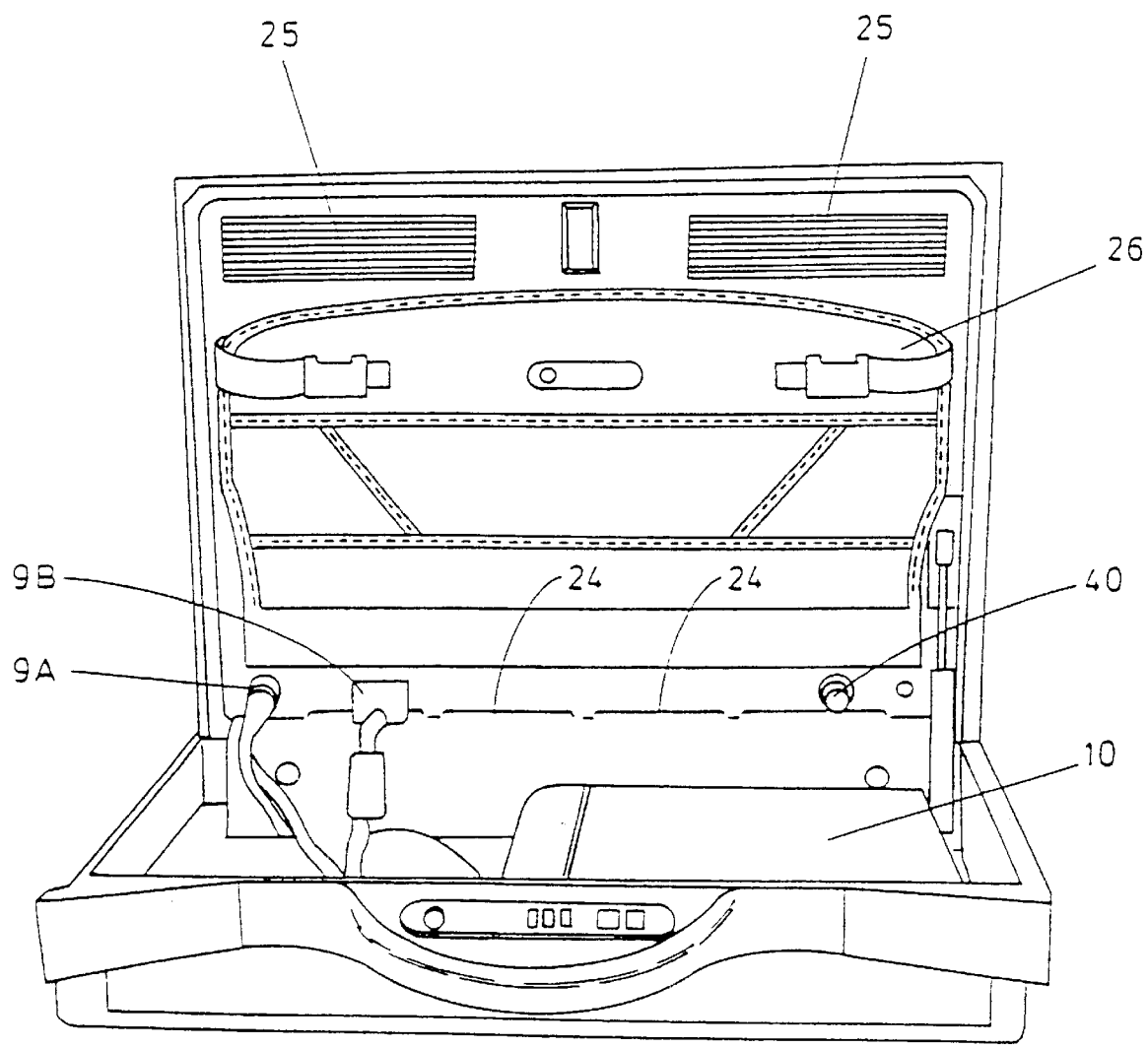
FIG. 7 is a perspective view of the device of the second embodiment showing the interior configuration thereof.
Figure 8:
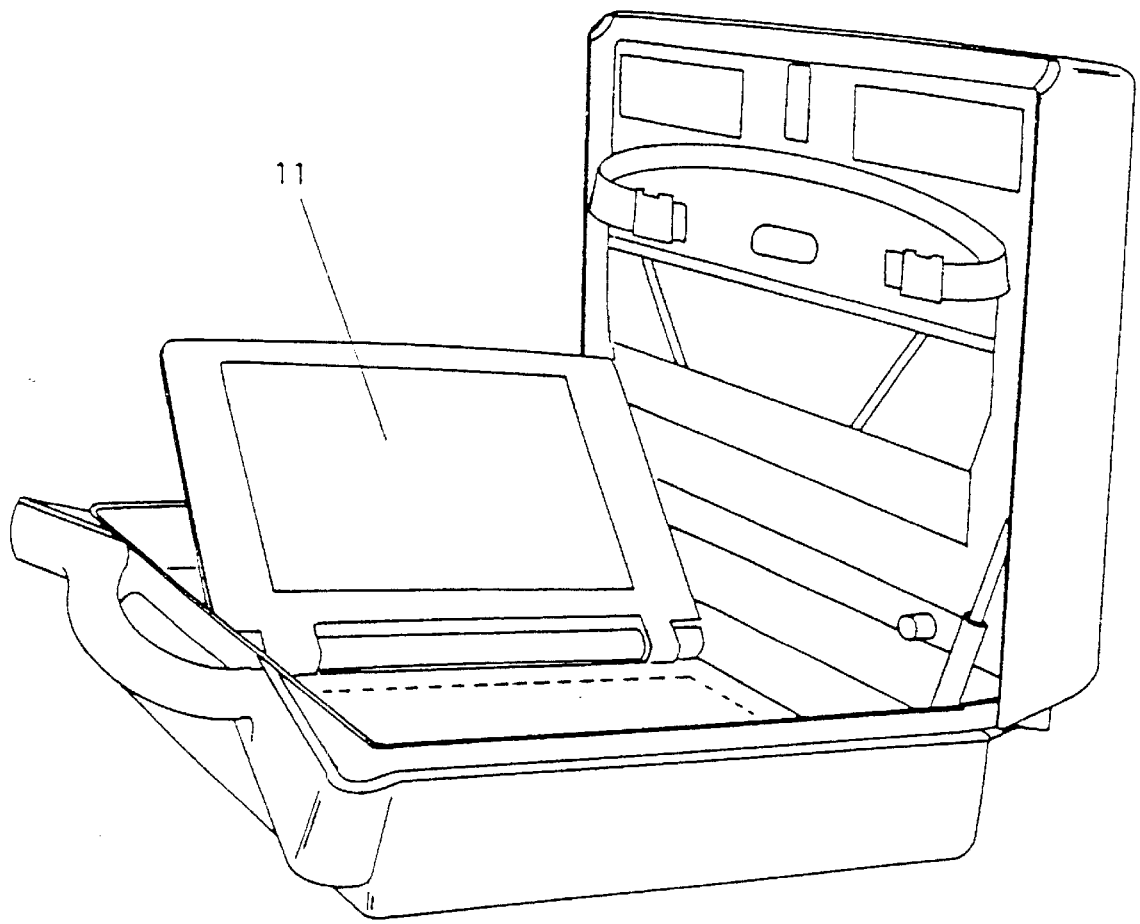
FIG. 8 is another view showing the interior of the second embodiment.
Figure 9:
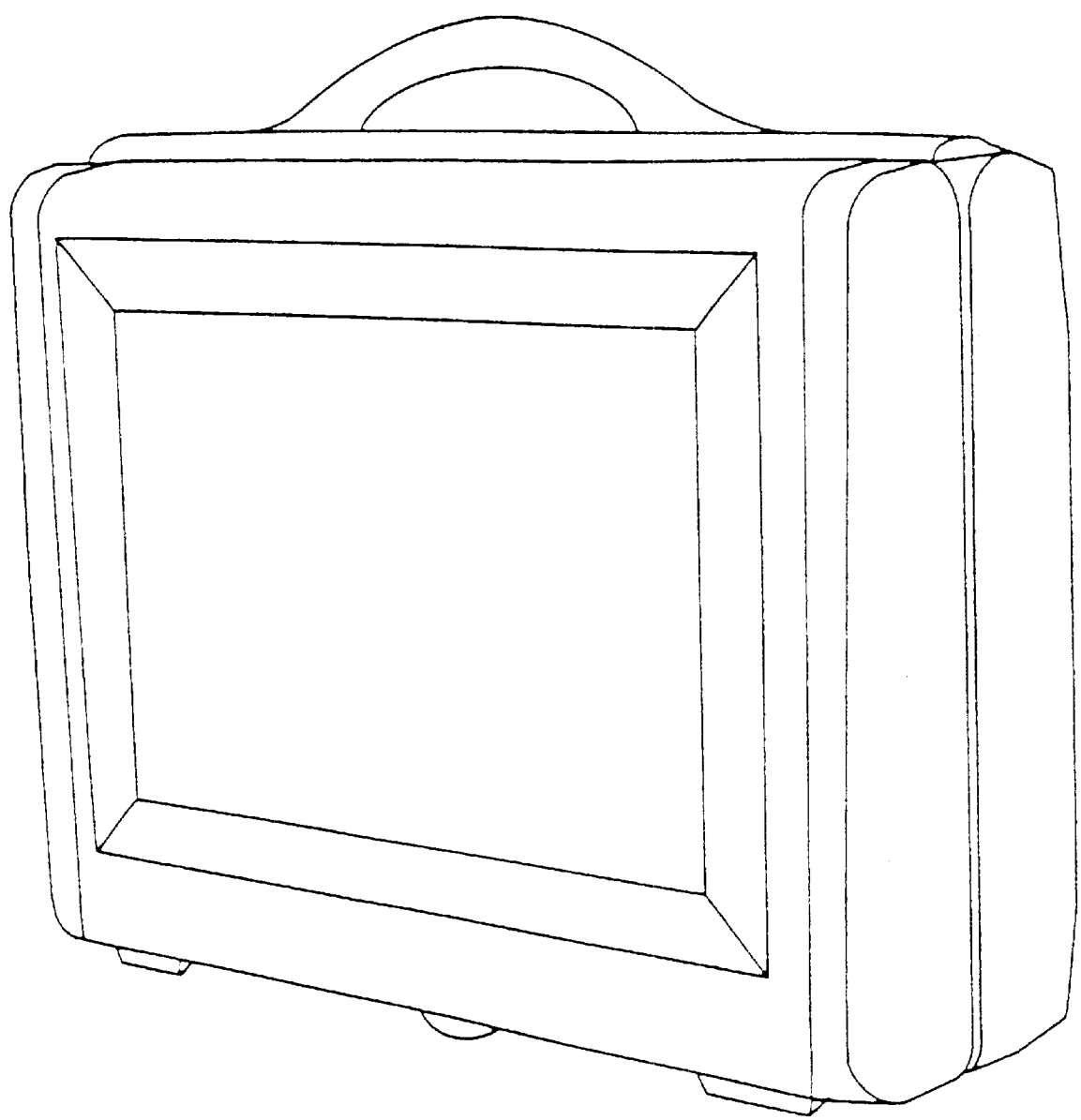
FIG. 9 is a perspective view of the device of the second embodiment in a closed configuration.

Referring now to FIGS. 7 to 9, some additional features of the apparatus will be described.

In FIG. 7, there is shown a pair of interconnectors 9A and 9B. The first interconnector 9A is connected to the transformer 13A and the second connector 9B may be connected to a controller 10. The controller 10 shown is a lap top computer having a second display device 11 built-in.

The second embodiment of the invention works in much the same way as the first embodiment of the invention in that the controller 10 may be used to manipulate any presentation given via the LCD screen, such manipulation being achievable via a touch screen mechanism for second display 11, or via keys of a keyboard of the controller 10.

Presentations with sound may also be accommodated, with the electronic assemblies 22 having facilities for driving a mini-speaker. The volume of such a mini-speaker may be controlled by a volume control 40.

Document pockets 26 may include various different compartments for storing of papers and pens etc. The trim panel 23 is also provided on a rear face thereof with means for cooling the device (should that be necessary). The cooling means operates by drawing air through inlets 24 by means of a small fan unit (not shown) forming part of the electronic assemblies 22 and expelling the air through air outlets 25.

Referring now to FIGS. 10A to 10D, a third embodiment is shown. Details of the third embodiment which are identical to those of the first and/or second embodiment will not be further described. The particular noteworthy features of the third embodiment concern how the lid 3 is arranged with respect to the base 4.

Figure 10A:
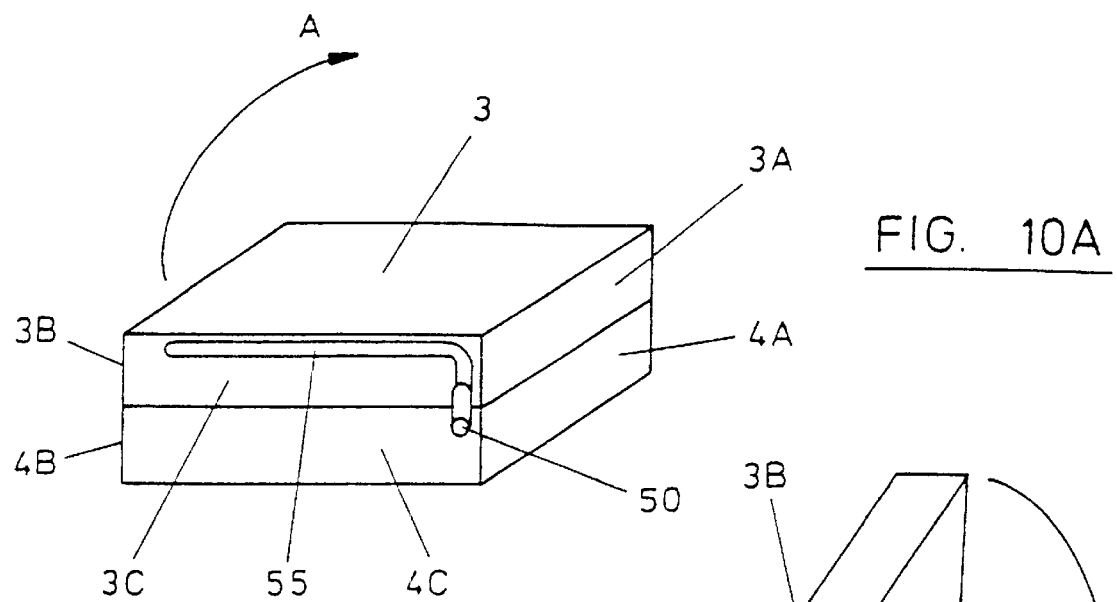
FIGS. 10A to 10F show a third embodiment of the invention.

Referring to FIG. 10A, there is shown the lid 3 and base 4 in a closed configuration. For reference, a lid face closest to a linkage area of the device 1 is denoted by reference 3A, a lid edge remote from the hinge mechanism in the closed position is denoted by reference 3B and a lid side face is denoted by 3C. Corresponding base parts are denoted by 4A, 4B and 4C.

Instead of having a conventional hinge mechanism, the embodiment of FIGS. 10A to 10D includes a lid pivoting mechanism comprising a fixed pivot post 50 attached to the base 4, this fixed post 50 having associated with it a link member comprising moveable linkage 51. The linkage 51 is shown in more detail in side profile and front elevation in FIGS. 10E and 10F respectively and comprises a plate-like member 52 having an aperture 53 formed at one end thereof and adapted to receive the post 50 and, at the other end thereof, it is provided with a projection 54 having an enlarged head 54A in such a manner as to allow the lid to both slide with respect to the base and be rotatable with respect thereto. The head 54A is dimensioned so as to cooperate with an at least partially shrouded slot 55 formed in a side face 3D of the lid 3. The partially shrouded slot 55 is arranged to form a track so that enlarged head 54A follows and can run within the confines of the slot but not be pulled free of it.

Although not shown, it will be appreciated that on the side face of the lid 3 opposing side face 3C, there is a similar partially shrouded slot 55, a post 50 and a linkage 51. Movement of the lid 3 from the closed position to the open position will now be described.

FIG. 10A shows the device in the closed position with lid end face 3A adjacent to base end face 4A, lid side face 3C above base side face 4C and lid edge 3B above base edge 4B.

Figure 10B:
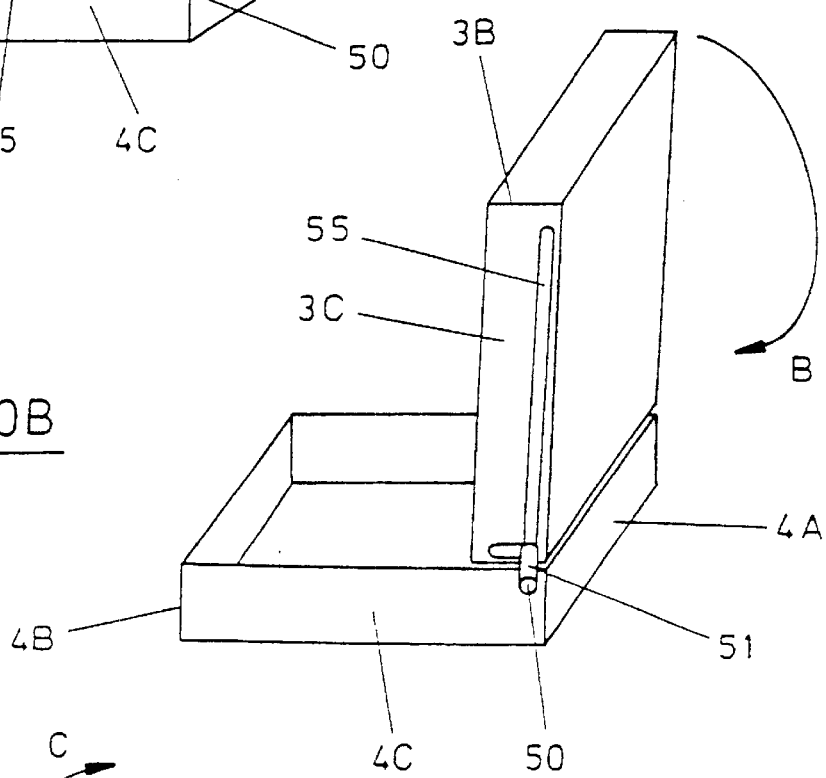
Figure 10C:
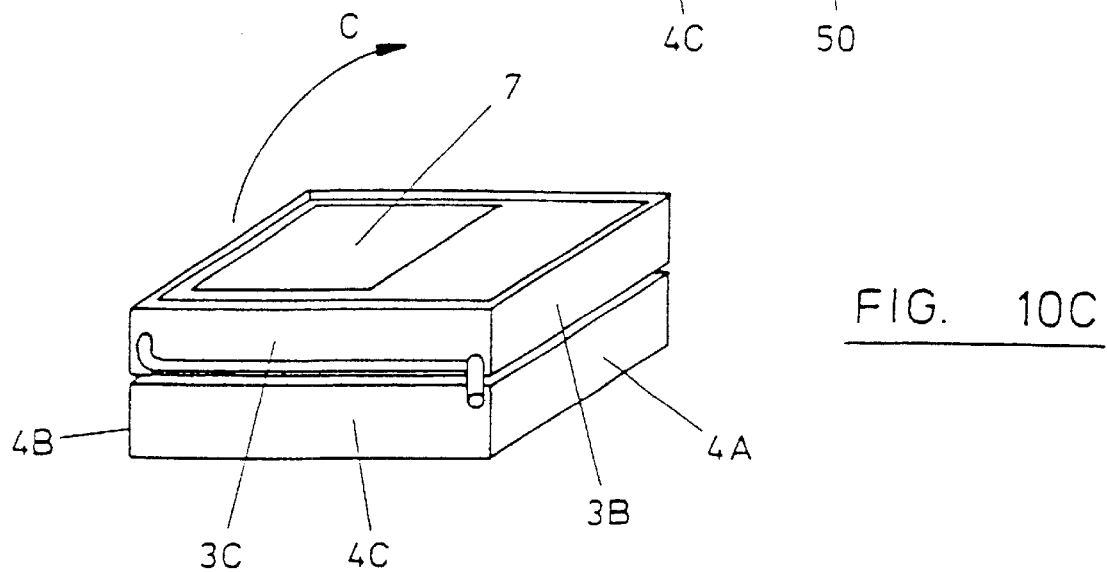

In order to open the device, the lid 3 is unlocked from the base 4 by a locking mechanism (not shown) and rotated in the direction shown by arrow A and brought to the position shown in FIG. 10B. It will be appreciated that since the enlarged head 54A of the link 51 can move within (but not be freed from) the partially shrouded slot 55, the lid may thereafter be tilted back on itself in the manner shown by arrow B of FIG. 10B so as to arrive in the configuration shown in FIG. 10C in which the face which previously formed the inside of the lid 3 is now outwardly facing. A final rotation in the direction of arrow C can bring the case to the open position shown in FIG. 10D.

Figure 10D:
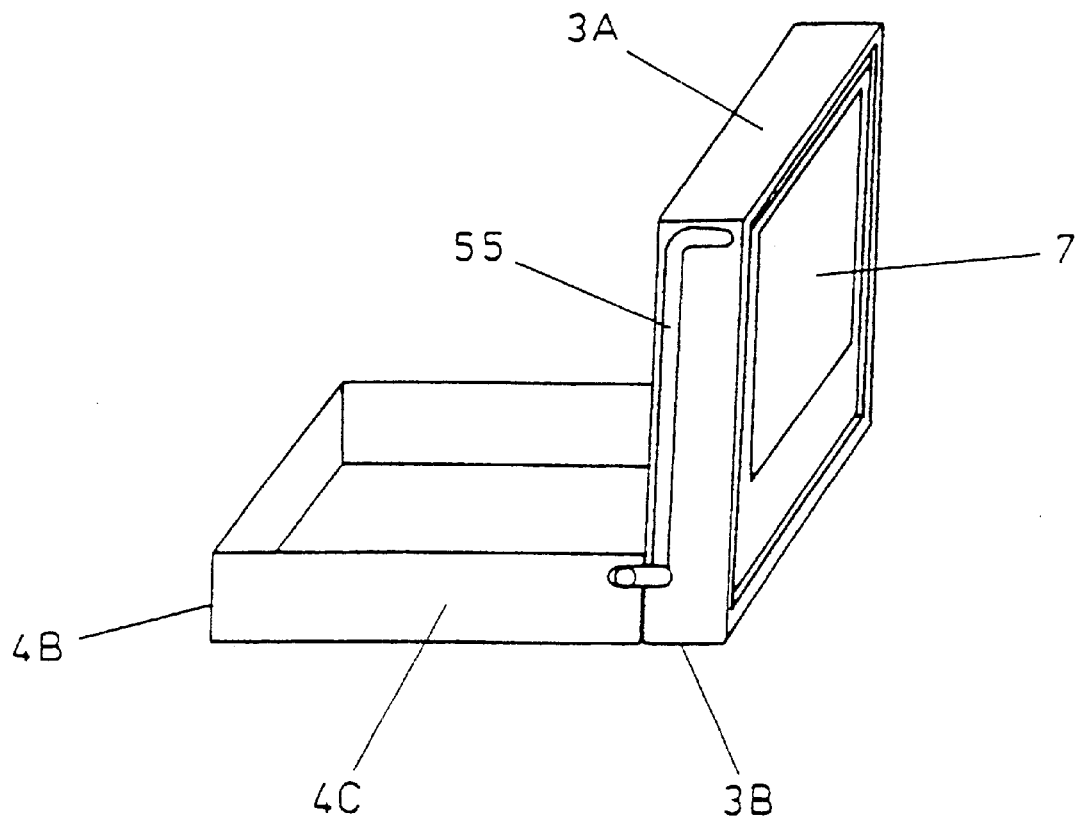
Figure 10E:
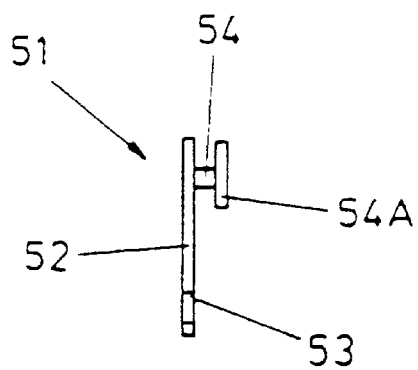
Figure 10F:
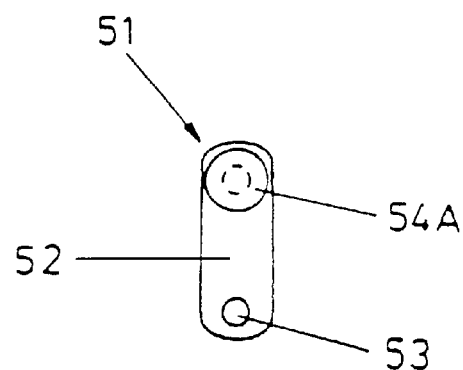

By referring to the sequence of drawings 10A to 10D, it can be seen that face 3A which started adjacent to face 4A in FIG. 10A has in FIG. 10D become uppermost and remote from face 4A and, more significantly, the inside lid of the device has now effectively become the external face. In this way, in this embodiment of the invention the first display device 7 may be built into the lid 3 such that when the device is not in use, the first display device 7 is securely stored inside the device whereas when a presentation is called for the device may quickly be brought into an open configuration in which the first display device may be conveniently viewed by an audience whilst the user can control the display in the same way as explained previously. By virtue of this mechanism, the display device 7 does not need an extra external cover to protect it from exterior tampering or battering.

Figure 11A:
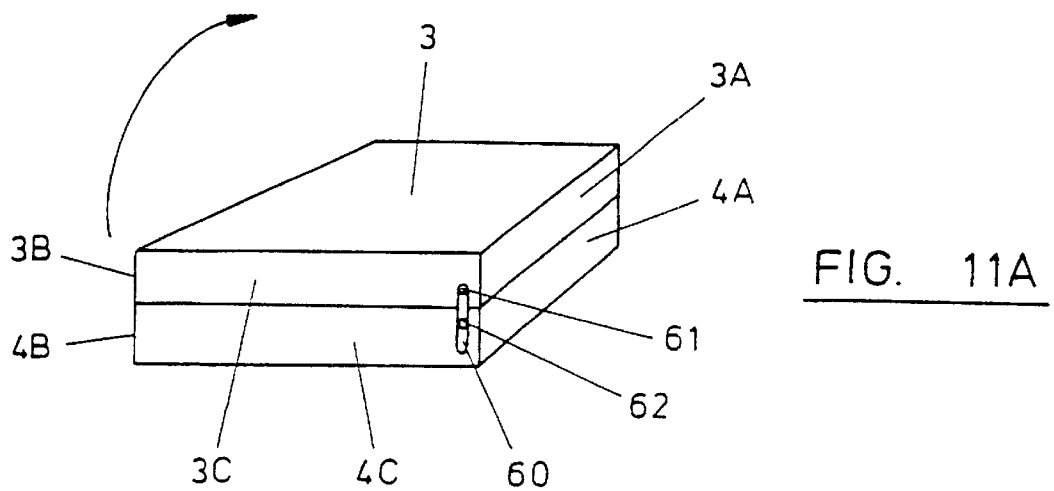
FIGS. 11A to 11C show detail of a fourth embodiment.
Figure 11B:
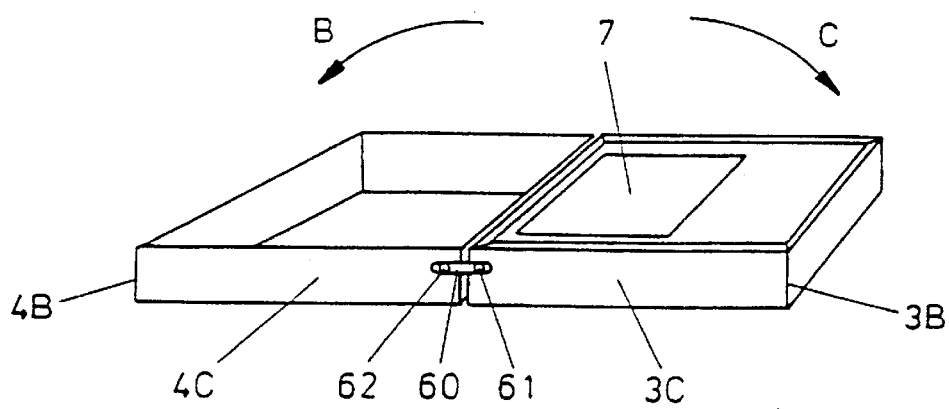
Figure 11C:
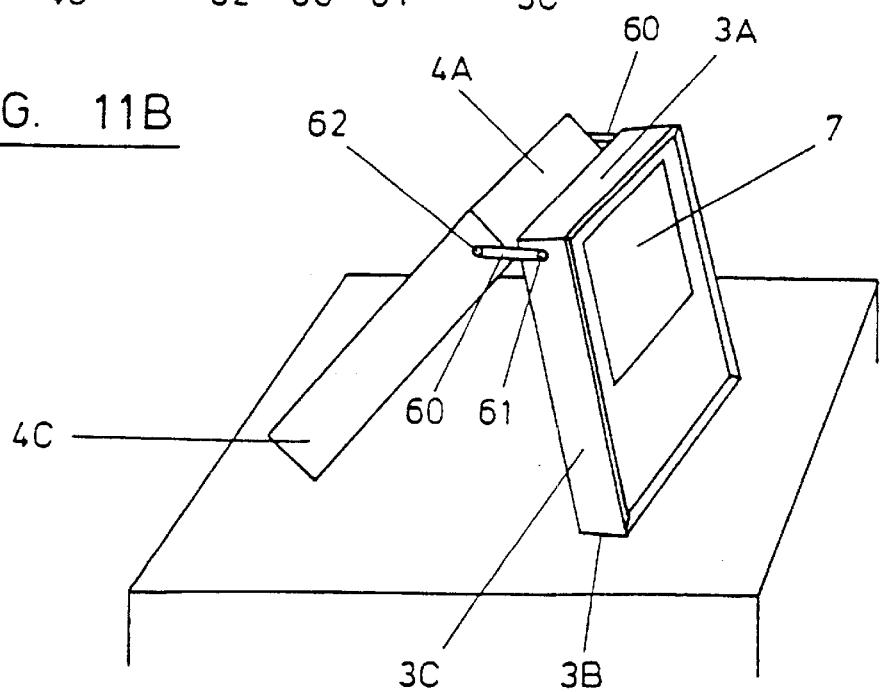

Referring now to FIGS. 11A to 11C, there is shown a second means by which a device having a first display device 7 can be provided with the first display device 7 protected in a closed position but exposed in the open position. In this case, the means to achieve this is simply provided by having a sliding elongated link member 60 associated with a pair of fixed posts 61, 62.

The faces and edges in FIGS. 11A to 11C are denoted in the same fashion as those faces and edges in FIGS. 10A to 10D. Briefly, FIG. 11A shows the device in the closed configuration with lid 3 atop base 4. Rotation of the lid in the direction of the arrow shown in FIG. 11A is permitted by the sliding linkage 60 which has its movement defined by fixed posts 61 and 62. In FIG. 11B, the device is shown in a configuration in which the lid end face 3A abuts the base end face 4A so that, in the view shown, both the interior of the base and the interior of the lid are visible. Further movement of the base 4 in the direction of arrow B and the lid 3 in the direction of arrow C can be made to bring the device into the configuration shown in FIG. 11C in which the fixed posts 61 and 62 are at end portions of the track of the elongated link member 60 and the base 4 and lid 3 are effectively leaning against one another to support each other in the configuration shown. In this manner, the base 4 forms a support for the lid 3 so as to maintain first display device 7 at a convenient viewing angle.

It will be appreciated that many variations to the present invention may be made, whilst still remaining within the scope of the attached claims. For instance, the device may include a built-in controller and peripherals such that pre-recorded presentations may be run simply and effectively. For instance, a sound and vision display could conveniently be recorded on DVD or mini-disk and simply replayed.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A presentation device (1) comprising:
    a container (2) having a lid (3) and base (4), the container being in the form of a brief case or attache case;
    a first display device (7) built into the lid (3); and
    means for driving the first display device (7), the presentation device being characterised in that in an in-use configuration, the container is arranged to be open with the interior of the case facing toward an operator and with the first display device facing away from an operator and toward a viewing audience, the means for driving the first display device (7) comprising a connector (9) to which a removable controller (10) may be attached, said controller (10) being able to be stored within the container and arranged to enable the operator to control the presentation of information to the audience, the presentation device being such that when the container is in a closed configuration, the first display device (7) is arranged to be protected from external tampering,
    wherein the first display device (7) is arranged for optimum viewing when the container (2) is in the open configuration with the first display device (7) oriented toward a viewer or toward the centre of a group of viewers,
    wherein the first display device (7) is built-in to the lid (3), and
    wherein the presentation device includes a removable cover (14) for covering the first display device (7) when not in use.

2. A presentation device according to claim 1, wherein the cover (14) is not removable when the container (2) is in a closed configuration.

3. A presentation device according to claim 2, wherein cover (14) is releasably associated with the lid (3) by latching means (37) manipulable from inside the container (2).

4. A presentation device according to claim 1, wherein the first display device (7) is built in to an inner face of the lid (3) in such a manner that in a closed configuration, the first display device (7) faces the interior of the presentation device and is thus protected from external tempering whereas, in an open configuration, the presentation device is reconfigurable such that, in use, the first display device (7) is arranged to face away from an interior region of the container.

5. A presentation device according to claim 1, wherein the first display device (7) is maintained in a viewing position by an end face (4A) of the base (4) leaning against, and supporting, an end face (3A) of the lid (3).

6. A presentation device according to claim 1, wherein the container is of sufficient dimensions to receive ancillary equipment.

7. A presentation device according to claim 1, wherein said means (9, 10) for driving said first display device (7) comprises connector (9) for connecting the removable controller (10) to the first display device.

8. A presentation device according to claim 7, wherein the connector (9) includes components to modify the signal passing through it to or from the removable controller (10).

9. A presentation device according to claim 1, wherein the controller (10) includes a second display device (11) which may be viewed by an operator whilst the first display device (7) can be viewed by the audience.

10. A presentation device according to claim 1, wherein the second display device (11) can display information relating to the first display device (7).

11. A presentation device according to claim 1, wherein the presentation device is operable without an external power supply.

12. A presentation device according to claim 1, comprising a power supply (13) built into the container.

13. A presentation device according to claim 1, wherein the presentation device includes at least one leg (8) for stabilising the presentation device when it is in an open configuration.

14. A presentation device according to claim 13, wherein the leg (8) is hingedly attached (30) to the presentation device.

15. A presentation device according to claim 14, wherein as the lid (3) is moved from a closed configuration to the open configuration, said leg (8) is automatically extended so as to maintain the lid (3) at an open position approximately perpendicular to the base (4).

16. A presentation device according to claim 15, wherein automatic extension of the leg (8) is achieved by providing an abutment (29) on the base (4) which, as the lid (3) is raised, urges the leg (8) towards a fully open position in which it can support the lid (3).

17. A presentation device according to claim 16, in which spring biasing is provided such that once the leg (8) has gone beyond a certain position, the biasing means automatically extends the leg (8) to the fully open position.

18. A presentation device (1), comprising:

a container (2) having a lid (3) and base (4), the container being in the form of a brief case or attache case;

a first display device (7) built into the lid (3); and means for driving the first display device (7), the presentation device being characterised in that in an in-use configuration, the container is arranged to be open with the interior of the case facing toward an operator and with the first display device facing away from an operator and toward a viewing audience, the means for driving the first display device (7) comprising a connector (9) to which a removable controller (10) may be attached, said controller (10) being able to be stored within the container and arranged to enable the operator to control the presentation of information to the audience, the presentation device being such that when the container is in a closed configuration, the first display device (7) is arranged to be protected from external tampering, wherein the first display device (7) is built in to an inner face of the lid (3) in such a manner that in a closed configuration, the first display device (7) faces the interior of the presentation device and is thus protected from external tampering whereas, in an open configuration, the presentation device is reconfigurable such that, in use, the first display device (7) is arranged to face away from an interior region of the container, wherein the presentation device is reconfigurable by means of providing left and right base post members (62) positioned on opposing base sides, left and right lid post members (61) positioned on opposing lid sides and left and right elongated link members (60) linking the left post members to each other and the right post members to each other, and wherein the elongated link members (60) each define an elongate slot which encloses an outer periphery of the posts (61, 62) which they link, said slot being sufficiently long to allow the lid (3) to be moved away from a position in which it overlies the base (4) in the closed position, in which closed position the interior of the lid (3) faces towards the interior of the base (4), and moved to an open position in which the lid interior and the base interior face in substantially opposite directions.

19. A presentation device according to claim 18, wherein, in use, in the open configuration, the lid (3) of the presentation device is arranged to be substantially at right angles to the base (4).

20. A presentation device according to claim 19, wherein the presentation device is reconfigurable by means of a lid pivoting mechanism having, on opposing side faces of the base, left and right side mechanisms comprising a pivot post (50) associated with a link member (51), a first end of the respective link member (51) being adapted to cooperate with the pivot post (50) and being rotatable about the pivot post (50) and a second end of the respective link member (51) being arranged to cooperate in a slidable manner with respect to the corresponding left or right lid side face to allow the lid (3) of the presentation device to slide with respect to the base (4) and to be rotatable so as to allow the interior face of the lid (3) to be moved into a configuration in which it faces away from the base (4).

21. A presentation device according to claim 20, wherein the second ends of the link members (51) interact with a track (55) formed on the corresponding lid side face to allow said sliding and rotating motion.

22. A presentation device according to claim 21, wherein the track (55) comprises a slot formed in the corresponding lid side face and track following means (54A) formed on the second end of the link member (51).

23. A device according to claim 22, wherein the track (55) comprises an at least partially shrouded slot and the track following means comprises an enlarged head (54A) formed on second end of the link member (51) and arranged to fit within said slot.

24. A presentation device (1), comprising:

a container (2) having a lid (3) and base (4), the container being in the form of a brief case or attache case;

a first display device (7) built into the lid (3); and means for driving the first display device (7), the presentation device being characterised in that in an in-use configuration, the container is arranged to be open with the interior of the case facing toward an operator and with the first display device facing away from an operator and toward a viewing audience, the means for driving the first display device (7) comprising a connector (9) to which a removable controller (10) may be attached, said controller (10) being able to be stored within the container and arranged to enable the operator to control the presentation of information to the audience, the presentation device being such that when the container is in a closed configuration, the first display device (7) is arranged to be protected from external tampering, wherein the first display device (7) is arranged for optimum viewing when the container (2) is in the open configuration with the first display device (7) oriented toward a viewer or toward the centre of a group of viewers, wherein the first display device (7) is built-in to an outer face of the lid (3), and wherein said controller (10) comprises a micro-computer, for instance, a palm-top or a lap-top computer.

25. A presentation device (1) comprising:

a container (2) having a lid (3) and base (4), the container being in the form of a brief case or attache case;

a first display device (7) built into the lid (3); and means for driving the first display device (7), the presentation device being characterised in that in an in-use configuration, the container is arranged to be open with the interior of the case facing toward an operator and with the first display device facing away from an operator and toward a viewing audience, the means for driving the first display device (7) comprising a connector (9) to which a removable controller (10) may be attached, said controller (10) being able to be stored within the container and arranged to enable the operator to control the presentation of information to the audience, the presentation device being such that when the container is in a closed configuration, the first display device (7) is arranged to be protected from external tampering, wherein the controller (10) includes a data storage device such as a CD Rom Drive or disc drive.

26. A presentation device, comprising:

a container having a cavity and a retractable lid; and an electronic display device built into the lid and facing outwardly therefrom a protector member selectively attachable to the lid and adapted to protect the display device, wherein the protector member is not removable from the lid when the lid is in the closed position.

27. The presentation device as specified in claim 26 wherein the display device is integrated into an outer surface of the lid.

28. The presentation device as specified in claim 26 wherein the device display is adapted to be driven by a control device disposed within the cavity.

29. The presentation device as specified in claim 28 wherein the control device is adapted to be selectively disposed within and removable from the cavity.

30. The presentation device as specified in claim 26 wherein the display device is adapted to be driven by a control device situated remote from the cavity.

31. The presentation device as specified in claim 26 wherein the cavity includes a connector adapted to couple the display device to a control device.

32. The presentation device as specified in claim 26 wherein the container is in the form of a brief case or attaché case.

33. The presentation device as specified in claim 26 wherein the lid s adapted to be disposed in an open position such that the display device faces a viewing audience.

34. The presentation device as specified in claim 33 wherein the container has a base, wherein the lid can be disposed at a right angle with respect to the base.

35. The presentation device as specified in claim 26 wherein the protector member is releasable from the lid via a latch accessible from within the cavity.

36. The presentation device as specified in claim 26 wherein the cavity is adapted to receive a portable computer therewithin.

37. The presentation device as specified in claim 26 further comprising a control device coupled to and driving the display device.

38. The presentation device as specified in claim 37 wherein the control device has associated memory adapted to store information for display on the display device.

39. The presentation device as specified in claim 37 wherein the control device comprises a notebook computer.

40. The presentation device as specified in claim 37 wherein the control device comprises a PDA.

41. The presentation device as specified in claim 26 wherein said cavity further comprises a docking terminal adapted to couple to a notebook computer.

42. The presentation device as specified in claim 26 further comprising a support member adapted to maintain the lid in a selected open position.

43. The presentation device as specified in claim 42 wherein the support member comprises a telescopic damper providing a controlled amount of damping to the lid during closing.

44. The presentation device as specified in claim 26 further comprising at least one leg stabilizing the container when the lid is in an open position.

* * * * *